United States Patent
Juranitch (10) Patent No.: US 11,925,886 B2
(45) Date of Patent: Mar. 12, 2024

(54) CONTROLLED FLUID CONCENTRATOR

(71) Applicant: XDI Holdings, LLC, Bedford, NH (US)

(72) Inventor: James Charles Juranitch, Fort Lauderdale, FL (US)

(73) Assignee: XDI Holdings, LLC, Bedford, NH (US)

( * ) Notice: Subject to any disclaimer, the term of this patent is extended or adjusted under 35 U.S.C. 154(b) by 261 days.

(21) Appl. No.: 16/613,253

(22) PCT Filed: May 15, 2018

(86) PCT No.: PCT/US2018/032752
§ 371 (c)(1),
(2) Date: Nov. 13, 2019

(87) PCT Pub. No.: WO2018/213299
PCT Pub. Date: Nov. 22, 2018

(65) Prior Publication Data
US 2020/0188810 A1 Jun. 18, 2020

Related U.S. Application Data

(60) Provisional application No. 62/506,285, filed on May 15, 2017.

(51) Int. Cl.
| | |
|---|---|
| B01D 3/42 | (2006.01) |
| B01D 1/00 | (2006.01) |
| B01D 1/14 | (2006.01) |
| C02F 1/04 | (2023.01) |
| C02F 1/10 | (2023.01) |
| C02F 103/36 | (2006.01) |

(52) U.S. Cl.
CPC ............. *B01D 3/42* (2013.01); *B01D 1/0082* (2013.01); *B01D 1/14* (2013.01); *C02F 1/041* (2013.01);

(Continued)

(58) Field of Classification Search
CPC ......... B01D 1/0082; B01D 1/14; E21B 43/24; E21B 43/2406; E21B 43/2408;

(Continued)

(56) References Cited

U.S. PATENT DOCUMENTS

| | | | |
|---|---|---|---|
| 2,384,587 A | 9/1945 | Badenhausen | |
| 2,936,215 A * | 5/1960 | Hochmuth | B01D 1/10 159/17.3 |

(Continued)

FOREIGN PATENT DOCUMENTS

| | | |
|---|---|---|
| RU | 2150587 C1 | 6/2000 |
| WO | 2018/094338 A1 | 5/2018 |

OTHER PUBLICATIONS

"Electronics Tutorial about a Closed Loop Systems", electronics-tutorials.ws, May 9, 2013 (date obtained from wayback machine), https://www.electronics-tutorials.ws/systems/closed-loop-system.html.*

*Primary Examiner* — Jonathan Luke Pilcher
(74) *Attorney, Agent, or Firm* — Dykema Gossett PLLC (57) ABSTRACT

Various embodiments of the present disclosure can include a system for producing a controlled concentrated waste fluid. The system can comprise a concentrator and the concentrator can be selected from the group consisting of an evaporator and a distillation system. The system can include a feedback sensor and the feedback sensor can include a total dissolved solids (TDS) sensor disposed in a waste stream associated with the concentrator.

10 Claims, 5 Drawing Sheets

(52) U.S. Cl.
CPC .......... *C02F 1/10* (2013.01); *C02F 2103/365* (2013.01); *C02F 2209/003* (2013.01); *C02F 2209/09* (2013.01); *C02F 2209/10* (2013.01)

(58) Field of Classification Search
CPC ................ E21B 43/34; C02F 2209/003; C02F 1/04–18; G05D 21/00; G05D 21/02; G05D 23/027
USPC .............................. 159/4.02, 16.2, 16.1, 16.3
See application file for complete search history.

(56) References Cited

U.S. PATENT DOCUMENTS

| | | | |
|---|---|---|---|
| 3,147,598 A | | 9/1964 | Wilson |
| 3,241,599 A | * | 3/1966 | Jobe ..................... B01D 1/0082 159/44 |
| 3,954,381 A | * | 5/1976 | Marecaux ............... F23G 7/008 159/13.4 |
| 5,595,663 A | * | 1/1997 | Bowles ................... B01D 1/14 95/149 |
| 5,695,643 A | * | 12/1997 | Brandt ................... C02F 1/441 210/651 |
| 2014/0021030 A1 | | 1/2014 | Schubert |
| 2014/0123620 A1 | | 5/2014 | Huntington et al. |
| 2014/0158517 A1 | | 6/2014 | Shirley |
| 2014/0190817 A1 | | 7/2014 | Mays |
| 2015/0122498 A1 | * | 5/2015 | Duesel, Jr. .............. C02F 1/048 166/305.1 |
| 2016/0319702 A1 | | 11/2016 | Martindale |
| 2017/0349452 A1 | * | 12/2017 | Chiu ................... B01D 1/0094 |

* cited by examiner

CONTROLLED FLUID CONCENTRATOR

CROSS-REFERENCE TO RELATED APPLICATIONS

This application is a United States national stage application of International application no. PCT/US2018/032752, filed 15 May 2018 (the '752 application) and published under International publication no. WO 2018/213299 A1 on 22 Nov. 2018. This application claims the benefit of U.S. provisional application No. 62/506,285, filed 15 May 2017 (the '285 application). The '752 application and the '285 application are incorporated by reference as though fully set forth herein.

FIELD OF THE INVENTION

Embodiments of the present disclosure relate generally to a method, apparatus and system for the controlled and preferably, closed loop controlled, concentration of inorganics and other solids in a waste fluid.

BACKGROUND

The Hydraulic Fracturing hydrocarbon recovery process has proven to be an effective way of recovering fossil energy, however, the process is not without negative issues. One of the undesirable traits is a larger disposal requirement to dispense with returned "frac water" and fossil water or salt laden brine water, which is produced during the balance of the hydrocarbon recovery process after the fracturing process is completed. This fossil water is simply known as "produced water" and contains large amounts of salts; in some cases, over 200,000 parts per million (ppm) of salts. Fortunately, in many cases, the solids content is considerably less and can be similar to sea water at approximately 30,000 to 40,000 ppm.

For every barrel of oil recovered in a Fracing operation, there is typically between 3 to 10 barrels of produced water that needs to be disposed of. In some formations, the produced water ratio can be below 1 barrel of water per barrel of oil, but a large percentage of the formations return between 3 to 10 barrels of produced water per barrel of oil. To date, the current practice for produced water disposal is deep well injection. The produced water is effectively pumped deep into the ground. The requirement of produced water disposal is one of the most costly components of the fracing process.

The transportation of the produced water by collection piping systems or trucks is a large portion of the costs of produced water disposal. A way to minimize the amount of produced water volume from a fracing site is highly desirable, partly because it would have a profound positive economic effect on the fracing operation. At the same time, the resulting concentrated produced water cannot negatively affect a disposal well's life. Not much is conclusively known relative to a disposal well's geological formation and absorption characteristics. Care and caution is preferred when a new waste fluid process is developed and the resultant fluid is to be injected into a disposal well. Experience in a well's acceptance of a fluid's characteristics is usually the best guide in terms of determining the absorption characteristics associated with the disposal well. A controlled way of producing an optimally concentrated produced water that will be acceptable in current Salt Water Disposal (SWD) wells is needed.

BRIEF SUMMARY

Various embodiments of the present disclosure can include a system for producing a controlled concentrated waste fluid. The system can comprise a concentrator and the concentrator can be selected from the group consisting of an evaporator and a distillation system. The system can include a feedback sensor and the feedback sensor can include a total dissolved solids (TDS) sensor disposed in a waste stream associated with the concentrator.

Various embodiments of the present disclosure can include a system for producing a closed loop controlled concentrated waste fluid. The system can comprise a concentrator and the concentrator can be selected from the group consisting of an evaporator and a distillation system. The system can comprise a feedback sensor. The feedback sensor can include a total dissolved solids (TDS) sensor disposed in a waste stream associated with the concentrator and a closed loop controller in communication with the TDS sensor. The closed loop controller can be configured to react to the feedback.

DETAILED DESCRIPTION

Embodiments of the present disclosure relate generally to a method, apparatus and system for the controlled and preferably a closed loop controlled concentration of inorganics and other solids in a waste fluid. The system, apparatus and method can be used in the enhanced oil recovery industry in processes such as Hydraulic Fracturing, or any other application which requires concentration of a fluid. Embodiments of the present disclosure can provide a controlled way of producing an optimally concentrated produced water that will be acceptable in current Salt Water Disposal (SWD) wells.

The waste fluid disposal industry prefers to use deep well injection. The cost of disposal is typically directly related to the volume of fluid needing to be disposed of. The transportation of the waste fluid to a disposal well is also directly related to the volume. If the volume of the waste fluid can be minimized to an optimized level this will in turn minimize the cost associated with the waste disposal process.

Waste disposal wells are not well understood. It is in the best interest of the well's owner to be conservative in the range of fluids injected into a well. Two of the dominant characteristics that can negatively affect the life of a disposal well are the viscosity of the injected fluid and the solids content of the fluid. High viscosities are discouraged and any fluid that is not a solution is not ideal. In other words, a slurry or any fluid that has a precipitate in it poses a higher risk relating to the contamination and life expectancy of a disposal well.

Embodiments of the present disclosure can include a method for the control of a fluid concentrator. The fluid concentrator can be controlled to provide an optimized level of total dissolved solids (TDS) in an output stream from the controlled fluid concentrator, such that the output stream does not include a precipitate or slurry. In some embodiments, the controlled fluid concentrator can reliably produce an output stream that includes the maximum amount of contaminant (solids, etc.) and minimum amount of fluid volume to minimize the cost of the waste fluid process and optimize the life of the disposal well.

Some embodiments of the present disclosure can include a fluid concentrator that is a conventional distillation or evaporator system, such as a pond, compression evaporator, and/or multiple effect distillation process, and/or other systems known to those skilled in the art, or it can be a more advanced distillation system that includes a direct steam generator, such as that disclosed in PCT patent application no. US2017/062571 titled dirty water distillation and salt harvesting system, method, and apparatus, which is incorporated by reference in its entirety as though fully set forth herein.

Figure 1:
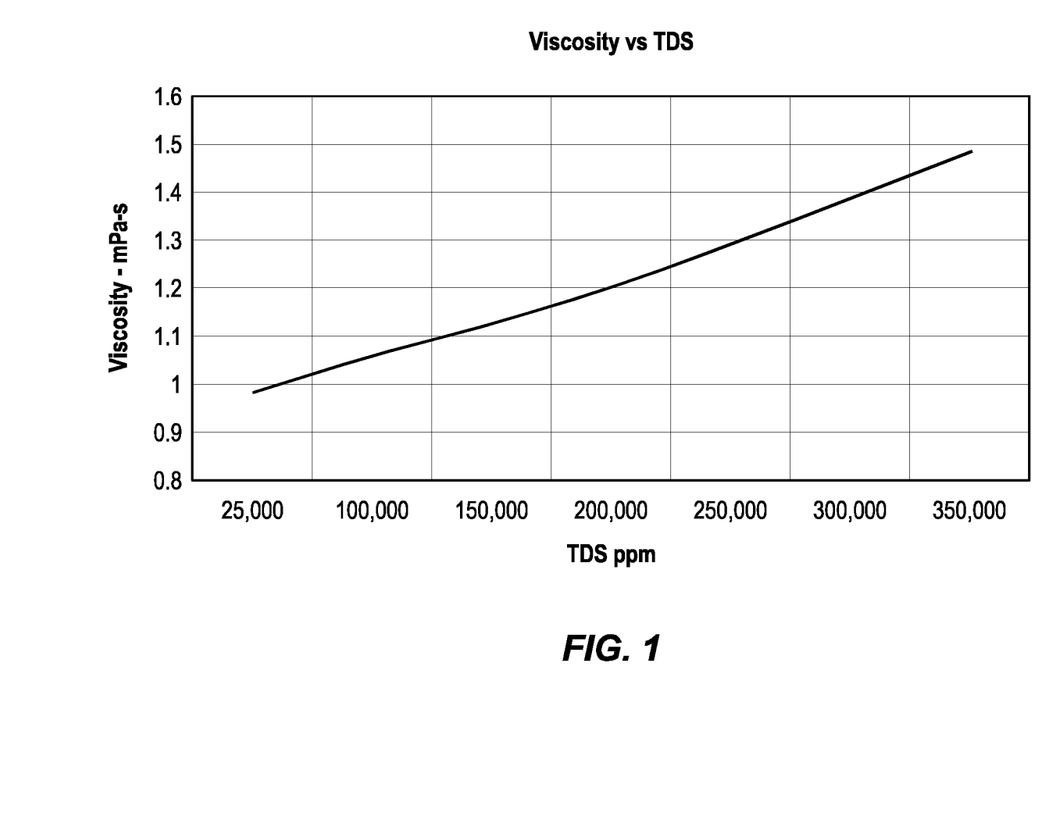
FIG. 1 depicts a plot of produced water viscosity versus Total Dissolved Solids (TDS), in accordance with embodiments of the present disclosure.

FIG. 1 depicts a plot of produced water viscosity versus Total Dissolved Solids (TDS), in accordance with embodiments of the present disclosure. As depicted, as the TDS of the fluid and/or slurry decreases, the viscosity of the fluid and/or slurry also decreases. In some embodiments, a preferred TDS can be approximately 325,000 ppm TDS for well disposal, however, the TDS can be varied as further discussed herein. At 325,000 ppm TDS, the viscosity can be between 1.4 mPa-s and 1.5 mPa-s.

Figure 2:
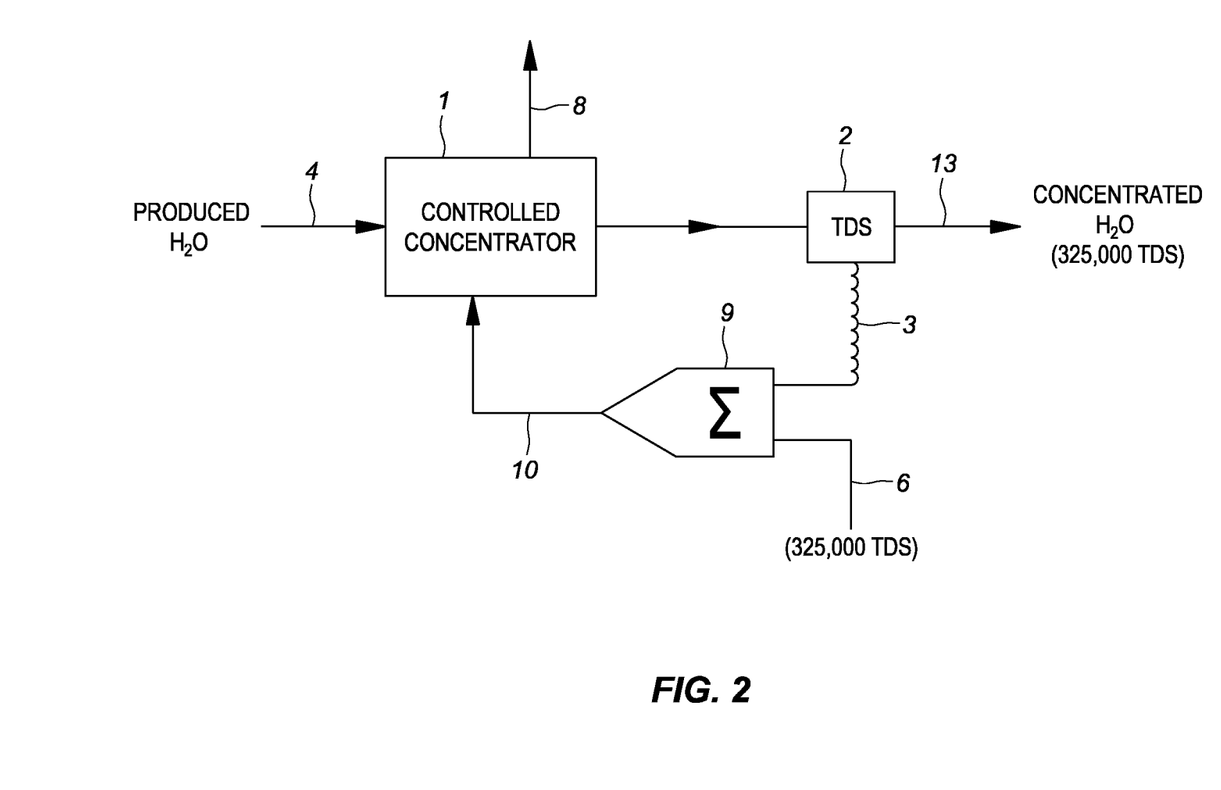
FIG. 2 depicts a flow diagram associated with a controlled fluid concentrator, in accordance with embodiments of the present disclosure.

FIG. 2 depicts a flow diagram associated with a controlled fluid concentrator 1, in accordance with embodiments of the present disclosure. The controlled fluid concentrator 1 can be selected from a number of different types of controlled fluid concentrators, such as a conventional distillation or evaporator system such as a pond, compression evaporator, and/or multiple effect distillation process, and/or other systems known to those skilled in the art. In FIG. 2, the controlled fluid concentrator 1 can be any type of fluid concentrator, as discussed herein, which is used in conjunction with embodiments of the present disclosure to provide for an improved, optimized, and controlled fluid concentrator 1. Produced and/or other contaminated water and/or fluid can be introduced into the concentrator via inlet conduit 4. In some embodiments, an evaporated fluid can be extracted from the controlled fluid concentrator via an outlet conduit 8, for example in a process such as a distillation system, compression evaporator, multiple effect distillation process, etc. A resultant concentrated waste fluid can flow out of the controlled fluid concentrator 1 via outlet conduit 13 (e.g., waste stream).

In some embodiments, a TDS sensor 2 can be disposed along the outlet conduit 13, such that the TDS sensor 2 can detect the level of TDS in a fluid passing through the outlet conduit 13. In an example, the TDS sensor 2 can be in communication with the fluids in conduit 13. In some embodiments, the TDS sensor 2 can include an analyzer such as a Rosemount 1056 using an Endurance 400 or 410 series sensor, both made by Emerson. The resultant feedback signal 3 from the TDS sensor 2 can be provided to a controller 9. Controller 9 could, in an open loop system, be a human exacting intervention in a crudely controlled system such as a pond evaporation system. In that example, a human in an open loop control system could turn on a dilution feed pump or a waste fluid evacuation pump attached to the pond when the desired TDS level was achieved. The same pond could be close loop controlled by the addition of a controller 9 activating the pump systems (pumps not shown). For example, the controller 9 can receive a signal from the TDS sensor 2, and based on the received signal can activate the pump system. The controller 9 could be a proportional controller, a proportional integrating controller, a proportional, derivative and integrating controller or any other controller known to those skilled in the art. Control set point 10 can react to a TDS set point 6, which can ideally be set to a high TDS level that is slightly below the fluids solubility limit. For example, the fluids solubility limit can be a TDS level that does not negatively affect a disposal well's life.

If a slurry is desired, a set point above the final temperature stabilization solubility limit can be chosen to produce a slurry. An example is a high temperature evaporation system such as a Direct Steam Generator also known as a Direct Contact Steam Generation system, which can be controlled to produce a brine solution at a concentration of 380,000 ppm at elevated temperatures, such as 250 degrees Fahrenheit, which when cooled to 40 degrees Fahrenheit would produce a slurry. For frac produced water, the TDS set point 6 may be set to a TDS content in a range from 200,000 ppm TDS to 400,000 ppm TDS. In some embodiments, an unachievably high TDS set point 6 could be used, which would produce solid salts and 100% evaporated fluids. An example of an unachievable set point can be 500,000 ppm TDS. In some embodiments, preferred TDS set point 6 may be set to a TDS content in a range from 270,000 ppm TDS to 350,000 ppm TDS. If a set point of, for example, 325,000 ppm TDS were chosen, then the concentrator would be ejecting from conduit 13 an optimized and controlled waste fluid for well disposal of approximately 325,000 ppm TDS. Although 325,000 ppm TDS is depicted as a set point in FIG. 2 and a TDS content for the output of outlet conduit 13, the set point and TDS content can be greater than or less than 325,000 ppm TDS.

Figure 3:
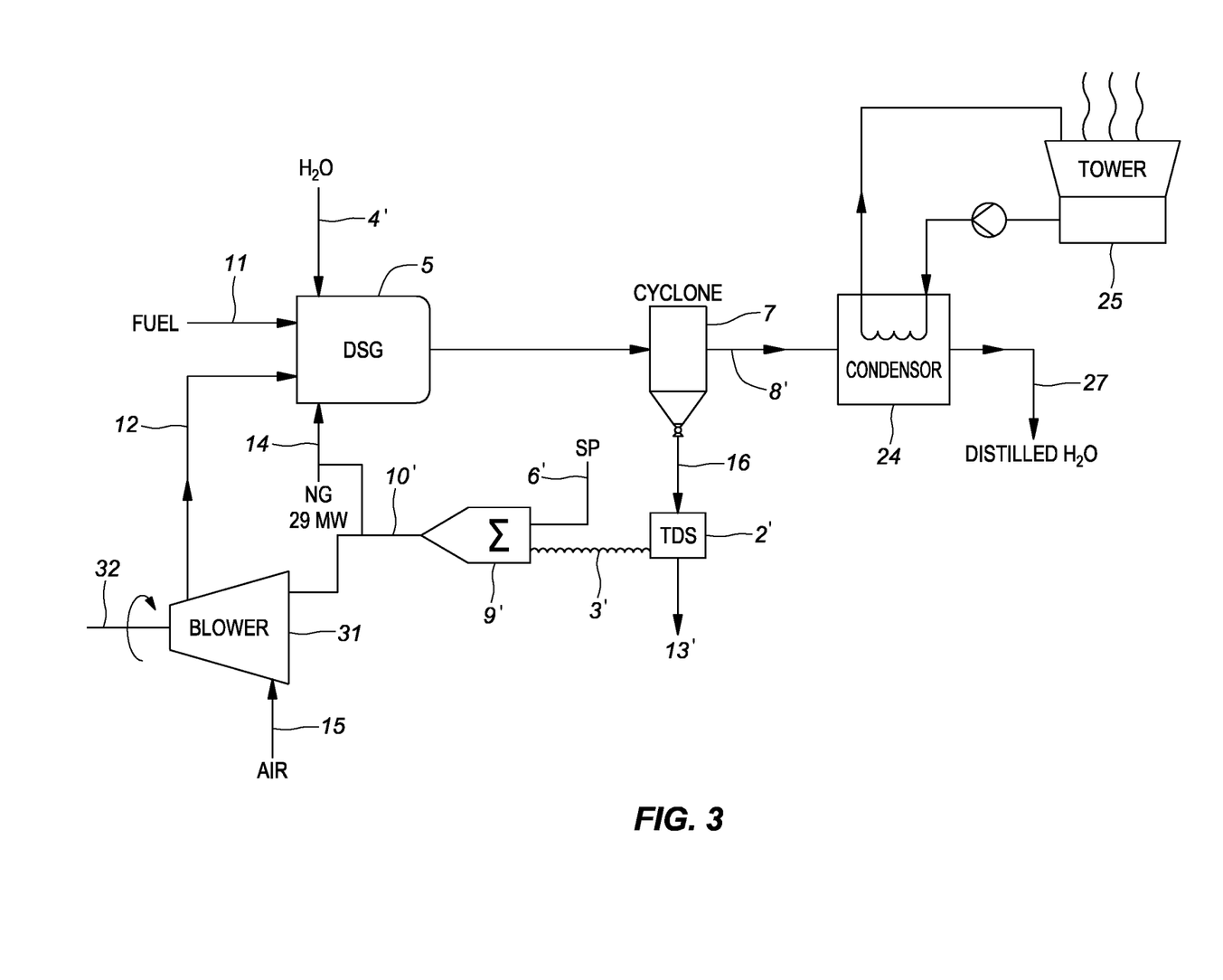
FIG. 3 depicts a flow diagram associated with a controlled fluid concentrator that implements a direct steam generator, in accordance with embodiments of the present disclosure.

FIG. 3 depicts a flow diagram associated with a controlled fluid concentrator that implements a direct steam generator 5, in accordance with embodiments of the present disclosure. FIG. 3 includes components that are similar to or the same as those described in FIG. 2, as denoted by the "primes." For example, the TDS sensor 2' depicted in FIG. 3 can be the same as the TDS sensor 2 depicted in FIG. 2. In some embodiments, the flow diagram depicted in FIG. 3 can include similar or the same features to those discussed in relation to those disclosed in PCT patent application no. US2017/062571 titled dirty water distillation and salt harvesting system, method, and apparatus, which is incorporated by reference in its entirety as though fully set forth herein. Produced water 4' enters a direct contact steam generator 5. Depending on the heat load of the direct steam generator's 5 burner versus the produced water flow in produced water conduit 4' the steam quality into separator 7 can be affected. The heat load of the burner in the direct steam generator 5 can be controlled through the flow of fuel in fuel conduit 11 and oxidant in oxidant conduit 12. The vaporized or distilled water product in this system exits outlet conduit 8'. The concentrated fluid exits conduit 16 from the separator 7 (e.g., cyclonic separator). TDS sensor 2' with feedback signal 3' is reacted upon in controller 9' relative to set point 6'. As discussed above, the set point 6' for the controller 9' can include a particular TDS content. In some embodiments, the set point 6' for TDS content can be set to an unachievable set point, such as 500,000 ppm TDS. In some embodiments, the set point 6' for TDS content can be set to a value in a range from 200,000 to 400,000 ppm TDS. In some embodiments, the set point 6' for TDS content can be set to a value in a range from 270,000 ppm TDS to 350,000 ppm TDS. However, the set point 6' for the TDS content can be set to a value outside of the provided range in some embodiments.

Resultant closed loop control signal 10' can be configured to adjust the heat rate in the direct contact steam generator 5 up or down to maintain the correct level of TDS concentration in conduit 13'. In an example, some embodiments can include a supplemental fuel conduit 14, which can provide a varying amount of fuel to the Direct Steam Generator 5. For instance, a fuel controller (not depicted) can be electrically coupled with the controller 9', such that control signal 10' can cause the amount of fuel provided to the Direct Steam Generator 5 to be varied by the fuel controller. Similarly, the controller 9' can be coupled to a blower 31. The control signal 10' can cause an amount of power applied to a blower shaft 32 to be varied, thus providing a variable amount of air 15 through the oxidant conduit 12. Optional condenser 24 as disclosed in PCT patent application no. US2017/062571, is shown if the end user wants to reclaim the distilled water product.

In some embodiments, the system depicted in FIG. 3 can communicate the direct steam generator exhaust and steam to a condenser 24, which can be thermally coupled with a cooling tower 25 to make distilled water in conduit 27. In some embodiments, the generated steam can be used to compressed oxidant in conduit 12 for the DSG by using a shaft driven blower or compressor 31. In some embodiments, the power to turn the shaft 32 can be generated from an electric motor driven by a casing head fueled or other hydrocarbon fuel sourced internal combustion generator or Brayton cycle generator. The shaft 32 can also be powered directly by an internal combustion engine or Brayton cycle turbine operating on any fuel such as natural gas, diesel or casing head gas.

Figure 4:
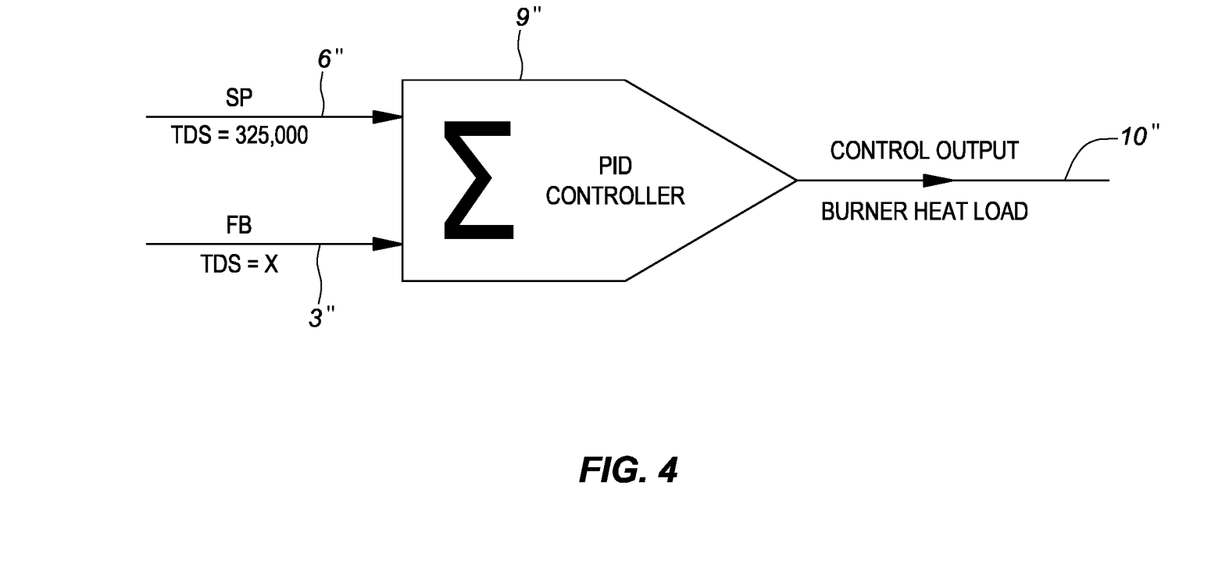
FIG. 4 depicts a schematic representation of a control system, method, and apparatus that is in accordance with embodiments of the present disclosure.

FIG. 4 depicts a schematic representation of a control system, method, and apparatus that is in accordance with embodiments of the present disclosure. FIG. 4 includes components that are similar to or the same as those described in FIGS. 2 and 3, as denoted by the "primes." For example, the feedback signal 3" depicted in FIG. 4 can be the same as the feedback signal 3 depicted in FIG. 2 and/or the feedback signal 3' depicted in FIG. 3. FIG. 4 shows a diagram of a proportional gain, derivative and integral (PID) controller 9", as also depicted in FIGS. 2 and 3. In FIG. 4, the set point 6" is shown to be 325,000 ppm TDS, which feedback 3" is compared to and output 10" is reactive to. Although the set point is depicted as 325,000 ppm TDS, the set point can be greater than or less than 325,000 ppm. In the example of the Emerson feedback sensor disclosed above, 100% resolution of the TDS level is accomplished in approximately 3 seconds which makes the resultant time constant of the sensor approximately 2 seconds or less, which is fast enough for a reliable and automated closed loop concentrator control system.

Figure 5:
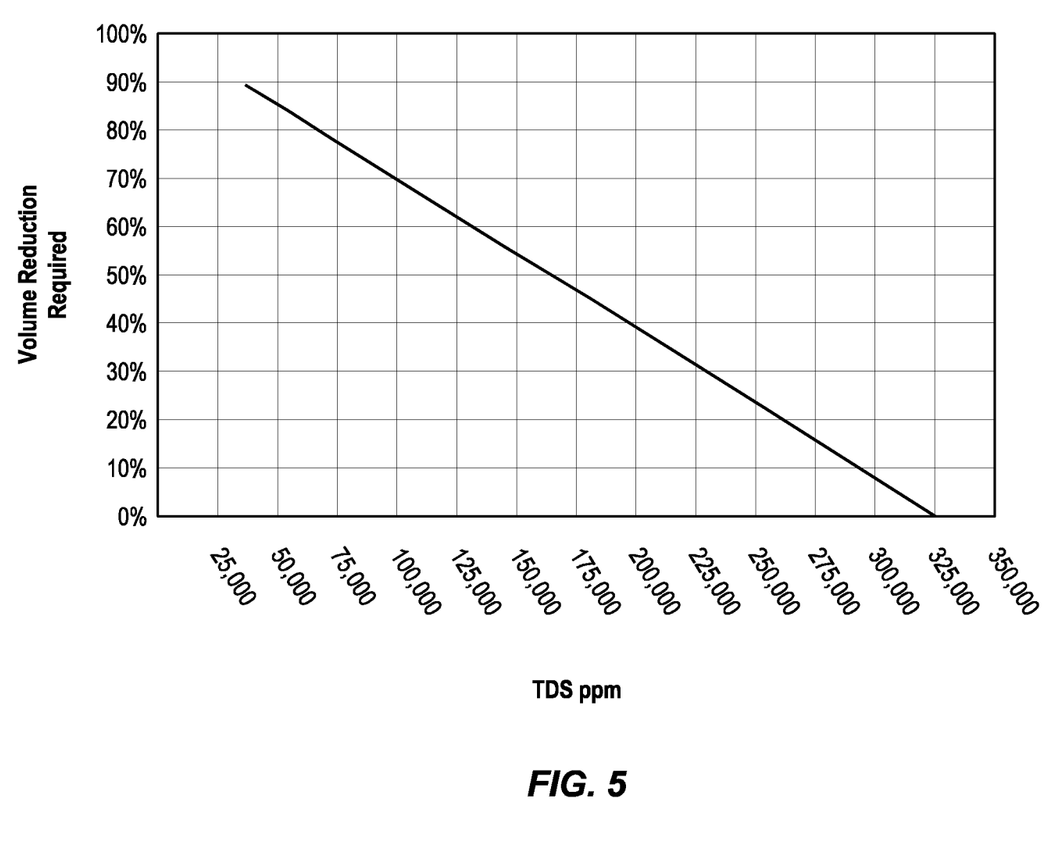
FIG. 5 depicts a plot of produced water volume versus concentration of TDS at 325,000 ppm that is produced by a method and apparatus that is in accordance with embodiments of the present disclosure.

FIG. 5 depicts a plot of produced water volume versus concentration of TDS at 325,000 ppm that is produced by a method and apparatus that is in accordance with embodiments of the present disclosure. In an example, FIG. 5 depicts a plot of the volume reduction of a fluid related to the final desired level of 325,000 ppm TDS as disclosed in embodiments of the present disclosure. In an example, the produced water in some fracing operations (e.g., such as those fracing operations conducted in Oklahoma) can have a TDS of approximately 35,000 ppm. The plot in FIG. 5 shows an approximately 90% reduction of fluid disposal, which can be accomplished through use of embodiments discussed in the present disclosure.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the endoscope of the embodiments, the endoscope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

What is claimed:

1. A system for producing a concentrated waste fluid, comprising:
   a concentrator, the concentrator selected from a group consisting of an evaporator and a distillation system;
   a separator disposed downstream of the concentrator;
   a feedback sensor, the feedback sensor including a total dissolved solids (TDS) sensor disposed in a waste stream outlet conduit of the separator, wherein an output of the feedback sensor is used to vary an amount of fuel provided to the concentrator via a fuel controller, wherein the concentrator includes a direct steam generator and a heat source for the direct steam generator is controlled by varying the amount of fuel provided to the concentrator via the fuel controller in relation to a TDS associated with a concentrated waste fluid that forms a slurry waste stream at the waste stream outlet conduit of the separator, wherein the waste stream outlet conduit is configured to convey the concentrated waste fluid that forms the slurry to a storage tank or down a disposal well.

2. The system of claim 1, wherein a fluid to be concentrated via the concentrator is a produced water from a hydrocarbon recovery process.

3. The system of claim 1, further comprising a closed loop control set point that is in a range from 200,000 ppm TDS to 400,000 ppm TDS.

4. The system of claim 1, wherein
an air fed to the direct steam generator is controlled in relation to the concentrated waste fluid that forms a waste stream from the outlet conduit.

5. The system of claim 1, wherein
an air fed to the direct steam generator is controlled in relation to a TDS associated with a concentrated waste fluid.

6. A system for producing a concentrated waste fluid, comprising:
a concentrator, the concentrator selected from a group consisting of an evaporator and a distillation system;
a separator disposed downstream of the concentrator;
a feedback sensor, wherein the feedback sensor is a total dissolved solids (TDS) sensor disposed in a waste stream outlet conduit of the separator, and a closed loop controller in communication with the TDS sensor, the closed loop controller configured to react to a feedback generated by the feedback sensor by causing an amount of fuel provided to the concentrator to be varied via a fuel controller, wherein the concentrator includes a direct steam generator and a heat source for the direct steam generator is controlled by varying the amount of fuel provided to the concentrator via the fuel controller in relation to a TDS associated with a concentrated waste fluid that forms a slurry waste stream at the waste stream outlet conduit of the separator, wherein the waste stream outlet conduit is configured to convey the concentrated waste fluid that forms the slurry to a storage tank or down a disposal well.

7. The system of claim 6, wherein a fluid to be concentrated via the concentrator is a produced water from a hydrocarbon recovery process.

8. The system of claim 6, further comprising a closed loop control set point that is in a range from 270,000 ppm TDS to 350,000 ppm TDS.

9. The system of claim 6, wherein
an air fed to the direct steam generator is controlled in relation to the concentrated waste fluid that forms the slurry.

10. The system of claim 6, wherein
an air fed to the direct steam generator is controlled in relation to the TDS associated with the concentrated waste fluid that forms the slurry.

\* \* \* \* \*